Nov. 12, 1929.   C. F. THOMPSON   1,735,222
STATOR FOR ALTERNATING CURRENT MOTORS
Filed June 23, 1928
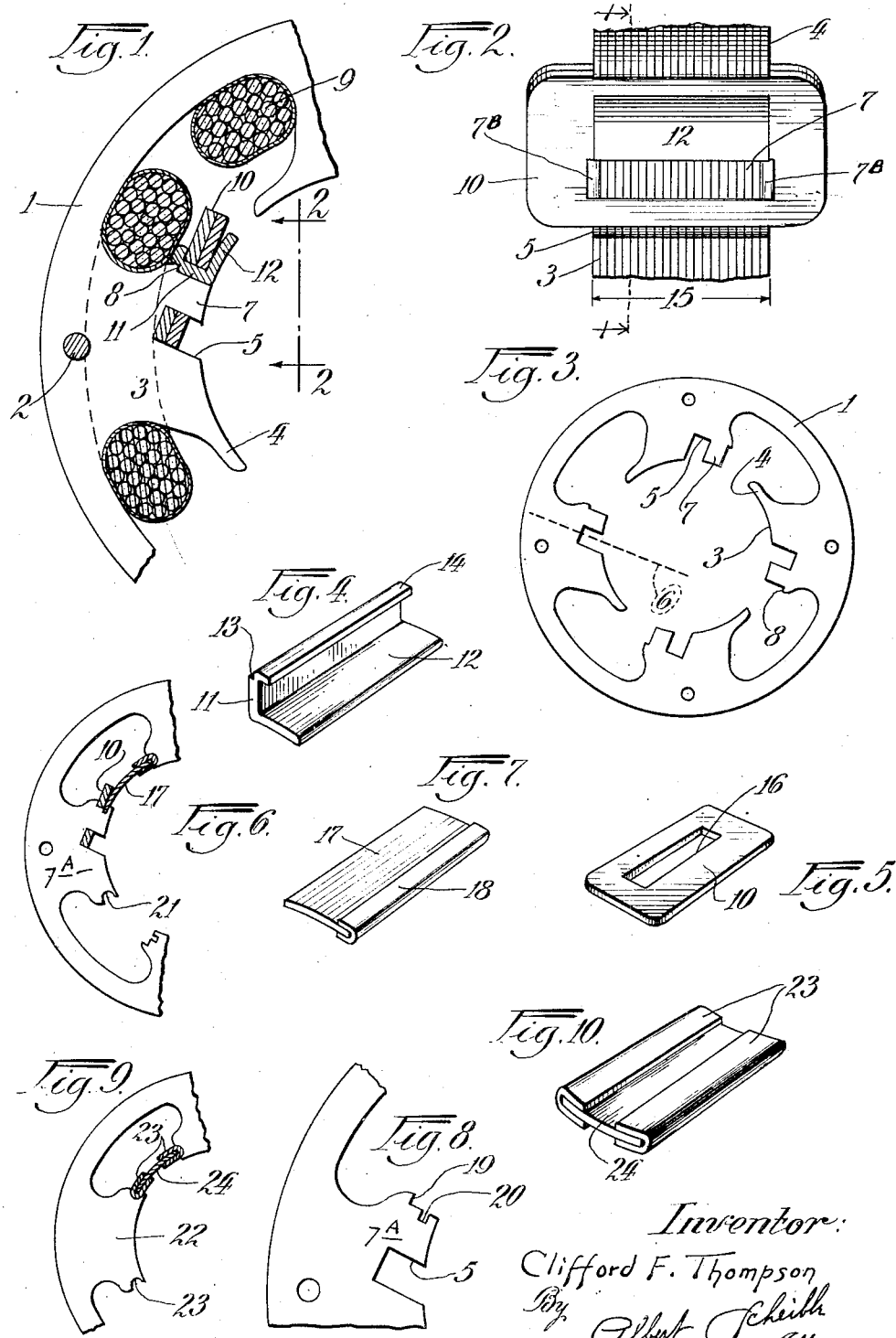
Inventor:
Clifford F. Thompson
By Albert Scheib
Attorney.

Patented Nov. 12, 1929

1,735,222

UNITED STATES PATENT OFFICE

CLIFFORD F. THOMPSON, OF OAK PARK, ILLINOIS, ASSIGNOR TO BODINE ELECTRIC COMPANY, OF CHICAGO, ILLINOIS, A CORPORATION OF ILLINOIS

STATOR FOR ALTERNATING-CURRENT MOTORS

Application filed June 23, 1928. Serial No. 287,687.

My invention relates to the cores of the stators of alternating current motors, and in its general objects aims to provide an easily manufactured stator assembly in which easily attached pole extensions reduce the magnetic gaps between the consecutive pole pieces, and in which such pole extensions can also serve for retaining shading coils in their operative positions.

In adapting alternating current motors to some classes of work, it is important that the magnetic gaps between the tips of consecutive pole pieces of the stator shall be quite small, and with stator cores constructed of single-piece laminations, the providing of such small gaps interferes with the ready attaching of the pre-wound field coils which need to be of considerably greater thickness than such gaps. For such stators, it has heretofore been proposed to construct each lamination of the iron core of sectors corresponding in number to the number of poles, as for example by making each four-pole lamination of four sectors; but this makes it difficult to secure an exact assembly of the sectors and a delicate balancing of the stator, unless these sectors together with the parts which connect them are constructed and assembled with a higher degree of accuracy than can be expected in commercial manufacturing.

In one of its main objects, my invention aims to overcome this objection by providing a stator in which the close approaching of the tips of the pole-pieces is provided by pole extensions which are attached after the field coils are slipped into position, thereby permitting the use of integral and accurately balanced laminations for the major core portions of the stator.

In another main object, my invention aims to provide novel means for securing pole extensions to the pole pieces, and aims to utilize the attached shading coils for this purpose; thereby facilitating the construction of stators which will afford small magnetic gaps and low hysteresis losses, which will consume very little more current in their field coils when the motor is running than when it is standing still, and in which the shading coils will produce the needed phase displacement for starting the motor. Moreover, my invention aims to provide a novel and cheaply manufactured pole extension for reducing the magnetic gap, and an arrangement whereby a shading coil holds such a pole extension in its effective position, and also aims to provide a pole extension and shading coil combination which can easily be attached to the stator core laminations after these laminations have been assembled.

Still further and also more detailed objects will appear from the following specification and from the accompanying drawings, in which Fig. 1 is a fragmentary radial section through a stator embodying my invention, taken along the face of one of the stator core laminations.

Fig. 2 is a fragmentary interior elevation of the same stator, taken from the line 2—2 of Fig. 1.

Fig. 3 is a reduced elevation of one of the iron stator core punchings or laminations of the stator of Figs. 1 and 2.

Fig. 4 is a perspective view of one of the pole extensions.

Fig. 5 is a perspective view of one of the shading loops.

Fig. 6 is a fragmentary radial section through another embodiment of my invention, taken along the face of one of the stator core laminations.

Fig. 7 is a perspective view of the pole extension of Fig. 6.

Fig. 8 is a fragmentary and enlarged elevation of the stator core lamination of Fig. 6.

Fig. 9 is a fragmentary radial section through still another embodiment of my invention, taken along the face of one of the stator core laminations.

Fig. 10 is an enlarged perspective view of the pole extension of the embodiment of Fig. 9.

In the embodiment of Figs. 1 to 5 inclusive, the core of the laminated stator comprises a plurality of counterpart annular soft iron punchings 1 assembled on longitudinal bolts 2, one of these punchings or laminations being shown separately in Fig. 3. Each of these annular laminations has inwardly directed pole-pieces 3—here shown as four in number—and each pole-piece has at its inner end an integral extension 4, these extensions on all of the pole-pieces being in the same direction circumferentially of the bore of the lamination. Each pole-piece also has a recess 5 extending into it from its said bore, preferably with the axis 6 of the recess extending at some distance from the center of the lamination. Each such recess is preferably offset from the axis of the pole-piece, so as to leave a relatively narrow and finger-like pole portion 7 toward which the extension 4 on the next pole-piece extends, and each pole-piece has at the outer edge of its said finger-like pole portion 7 a shoulder 8 alining with the bottom of the adjacent recess 5, which shoulder affords a ledge extending toward the next consecutive pole-piece.

With the counterpart pole-pieces on each lamination thus shaped, each pole extension 4 greatly reduces the gap between the inner ends of two adjacent pole-pieces, but leaves sufficient clearance so that pre-wound field coils 9 can be slipped respectively over the pole-pieces. To reduce each of the gaps between consecutive pole-pieces after the field coils have been slipped into position, I provide auxiliary and easily attached pole extensions, each of which attached pole extensions may also serve as means for anchoring a shading coil 10 to one of the pole-pieces.

Each such auxiliary pole extension is desirably punched of annealed sheet iron and of a length corresponding to the joint thickness 15 of the assembled laminations 1, and each such extension has its main web 11 at such an angle to a flange 12 that this flange 12 will have its inner face in the same cylindrical surface with the bore of the laminations when the outer face of the web 11 bears against the outer face of the finger-like pole portions 7 on one pole-piece of the assembled laminations. Each attached pole extension also has a longitudinal ledge 13 adapted to seat on the shoulder 8 of the adjacent pole-piece, and has a radially outward flange 14 spaced from the flange 12 by a distance corresponding to the effective thickness of the shading coil 10 which is to be retained in position by the pole extension.

Each shading coil (desirably of copper) may be made of a plurality of superposed O shaped punchings, one of which is shown in Fig. 5, with the bore 16 of each punching corresponding in length to the thickness 15 of the assembled stator laminations, and with the width of the said bore corresponding to the width of a pole finger 7 plus the thickness of the main web 11 of an auxiliary pole extension.

During the assembling, each main web 11 of an auxiliary pole extension is slipped through the bore or perforation 16 in one of the shading coils 10, and these two members are then slid over one row of the pole fingers 7 from the interior of the assembled laminations of the core of the stator, until the ledge 13 on the auxiliary pole extension seats on the alined shoulders 8 of the same pole fingers.

With the parts proportioned as above described, the shading coil 10 then seats on the bottoms of the recesses 5, the radially inner face of the web 12 is in the same cylindrical surface with the inner ends of the fingers 7 and the adjacent integral pole extension 4, and each finger 7 projects radially inward beyond the radially inward face of the shading coil 10.

I then bend the projecting end portion of the fingers 7 on each end lamination away from each other to clinch them against the radially inner face of the shading coil, as shown at 7B in Fig. 2, thereby simultaneously anchoring the auxiliary pole extension and the shading coil to one of the pole pieces.

Since a face portion of the shading coil seats on the bottom of the adjacent recess and since the ledge 13 on the pole extension seats on the lamination shoulder 8 which is in the same plane with this recess bottom, the assembled shading coil and pole extension are held in a predetermined position with respect to the two pole pieces between which the pole extension is disposed. By varying the width of the flanges 12 of these pole extensions, I can correspondingly vary the effective gaps between the consecutive poles, and by suitably curving each of these radially inner pole extension flanges 12 I can dispose their inner faces in the same cylindrical surface with the inner ends of the pole pieces which form integral parts of the lamination. Consequently, I provide an easily assembled stator construction which can be cheaply manufactured with a high degree of accuracy and which will afford the desired operating characteristics. The length of the inner flange 14 of each auxiliary pole extension is not material, and this flange may be omitted altogether if the part of the shading loop housed by the recess snugly fits the recess. However, I preferably make each such auxiliary pole extension of a substantially channel-shaped section radially of the stator, so as to facilitate the assembling of the parts and also to insure an exactly similar positioning of each shading coil with respect to a pole piece.

Moreover, while I have illustrated and described my invention in connection with a stator having four poles, and one in which each pole extension has a portion hooked through the bore of a shading coil, I do not wish to be limited to these or other details of the construction and arrangement here disclosed. The arrangement as above described could obviously be employed on stators having a different number of poles, and many other changes might be made without departing either from the spirit of my invention or from the appended claims.

For example, Figs. 6, 7 and 8, show an embodiment in which a pole extension comprises a part 17 formed of flat sheet metal and clamped along one longitudinal edge in a binding part 18, one of these parts being of sheet iron and the other of non-magnetic metal; and in which the pole piece 7A has at one edge a groove affording a ledge 19 in alinement with the bottom of the end recess 5 in that pole piece, and also has a lateral groove 20 between the ledge 19 and the tip of the pole piece. The shading coil 10 seats on both the ledge 19 and the bottom of the recess, while the extension part 17 engages the inward face of the shading coil and has its free edges socketed in the groove 20, so that the radially outer wall of this groove also forms a ledge directed toward the next consecutive pole-piece and engaged by the attached auxiliary pole extension. In this embodiment, each pole piece also has a lateral groove 21 on the edge opposite the groove 20, in which lateral groove 21 the binding 18 is seated.

Moreover, the slidable attaching of my pole extensions can also be employed on stators which are not provided with shading coils, it being obvious for example that the attached pole extension of Fig. 6 will serve their gap-reducing purpose if the illustrated shading coils were omitted.

So also, the iron portions of the attached pole extensions need not contact with any pole-pieces. Thus, Fig. 9 shows a portion of a stator in which each pole piece 22 has opposed edge recesses 23 near its free end for respectively socketing the two binding parts 23 which are clamped respectively over the longitudinal edges of an interposed part 24. In this case, the bindings 23 may be of soft iron while the interposed part 24 is of nonmagnetic material, or vice versa.

With each embodiment, the major laminations of the core, as well as the attached pole extensions are easily and cheaply made punchings, and the pole extensions can readily be slidably attached in definitely predetermined positions to the previously assembled laminations.

I claim as my invention:

1. In a motor, a stator having spaced inwardly directed pole-pieces each provided at its inner end with a groove longitudinal of the stator; pole extensions each having a portion bearing against one longitudinal face of a pole-piece, each pole extension being of a channel-shaped section radially of the stator, and shading coils each having portions respectively housed by one of the said grooves and extending through the channel of the adjacent pole extension.

2. In a motor, a stator having spaced inwardly directed pole-pieces each provided at its inner end with a groove longitudinal of the stator, pole extensions each having a portion bearing against one longitudinal face of a pole-piece, and shading coils each extending through one of the said grooves and around the said portion of a pole extension to clamp the latter to the adjacent pole-piece.

3. In a stator for a motor, an iron core having spaced inwardly directed pole-pieces, each pole-piece having a longitudinal recess in its inner end and a lateral shoulder alining with the bottom of the recess; shading coils each having a portion seated on the said bottom of the recess in one pole-piece, and pole extensions each having a portion engaging the said shoulder on one pole piece and another portion engaging the inner face of the shading coil associated with that pole-piece.

4. In a stator for a motor, an iron core having spaced inwardly directed pole-pieces, each pole-piece having a longitudinal recess in its inner end and a lateral shoulder alining with the bottom of the recess; shading coils each having a portion seated on the said bottom of the recess in one pole-piece, and pole extensions respectively disposed between the consecutive pole-pieces; each pole extension comprising a web in edgewise engagement with the lateral shoulder on one pole-piece and in flat-wise engagement with the lateral face of the same pole-piece, a radially inner flange engaging the radial inner face of the shading coil associated with that pole-piece and extending part way toward the next consecutive pole-piece, and a radially outer flange engaging the outward face of the same shading coil.

5. A stator for a motor, comprising an iron core having spaced inwardly directed pole-pieces; each pole-piece having at its inner end an integral extension directed toward the next consecutive pole-piece, and having in its inner end a longitudinal recess adjacent to the lateral pole-piece face which is opposite to the said extension; shading coils each looped through one of the said slots and over the said face on one of the pole-pieces; and pole extensions each attached to one of the said pole-pieces at its said lateral face and each retained upon the pole-piece by the shading coil associated with that pole-piece.

6. In a stator, a shading pole disposed between and freely spaced from two main poles, a shading coil extending around the shading pole, and a pole extension piece interlocked with the shading coil and extending toward the inner end portion of the second main pole, the shading coil and the pole extension being conjointly slidably affixed to the shading pole.

7. In a stator having an inwardly extending shading pole piece: an iron pole extension member of channel-shaped cross-section radially of the stator, the said member including a main web bearing against one side of the pole piece; and a shading coil passing around the pole piece and the said web, the pole extension member also including a flange engaging the inward face of the shading coil and an outward flange engaging the outer face of the shading coil, the said outward flange being of less width than the bore of the shading coil.

8. A stator comprising circumferentially spaced pole-pieces each having an integral pole extension extending toward the pole-piece which is rotationally behind it and each having at its inner end a groove extending longitudinally of the pole-piece; a pole extension member of channel-spaced section in a plane radially of the stator extending longitudinally of the stator adjacent to the opposite side of the integral pole extension and having its inner flange extending part way toward the integral pole extension on the next consecutive pole-piece, an elongated loop-shaped shading coil member having one longitudinal part thereof disposed in the said recess and the other longitudinal part thereof seated in the channel of the pole extension member, and means anchoring one of the said members to the pole-piece.

9. In a stator for an electric motor, a plurality of inwardly extending pole-pieces, a shading coil surrounding a portion of each pole-piece, means associated with the pole-piece for preventing radially inward movement of the shading coil; and a pole extension associated with each pole piece and comprising a web extending into the bore of the shading coil between the pole-piece and a portion of the shading coil, and a flange disposed inward of the shading coil and extending toward the next consecutive pole-piece.

10. In a stator for an electric motor, a plurality of counterpart inwardly pole-pieces; counterpart pairs of members having each pair respectively associated with one of the pole-pieces, one member of each pair being a shading coil extending around the pole-piece, and the other member being a pole extension having a web extending into the bore of the shading coil alongside the pole-extension and having a pole-extending flange extending along the inward face of the shading coil toward the next consecutive pole-picee; and means operatively interposed between each pole-piece and one of the members associated with that pole-piece for preventing movement of that member radially of the pole-piece.

11. A stator for an electric motor, including an annular core having main pole-pieces alternating with relatively narrower shading pole-pieces extending radially inward from it, each shading pole-piece being spaced by a narrow gap from the main pole-piece at one side thereof and by a wider gap from the main pole-piece at the other side thereof, field coils respectively extending around the radially outer portions of each main pole-piece and the shading pole-piece at one side thereof; shading coils respectively extending around the shading pole-pieces; pole extensions each extending along the inner face of the portion of the shading coil which extends through the adjacent wider gap; and means operatively anchoring each pole extension and the adjacent shading coil portion to the adjacent pole extension.

12. A stator as per claim 11, in which the portion of each shading coil extending through the narrower gap is narrower circumferentially of the stator than the portion of the shading coil extending through the wider gap.

13. In a motor, a stator having spaced and counterpart inwardly directed pole-pieces each having in its inner end a groove extending longitudinally of the stator, shading coils each associated with one of the pole-pieces and of less thickness than the depth of one of the grooves, each shading coil extending through one of the grooves and along a longitudinal side face of the pole-piece having that groove; and pole extensions each including a web clamped between the said pole-piece face and the bore of the shading coil associated with that pole-piece; each pole extension including two flanges respectively engaging the inner and outer faces of the adjacent shading coil and both extending toward the next consecutive pole-piece; the flange engaging the outer face of the shading coil being wider than the other flange and having its inward face in a common surface with the inner end of the pole-piece with which the pole extension is associated, the said surface being cylindrical and concentric with the axis of the stator.

Signed at Chicago, Illinois, June 18th, 1928.

CLIFFORD F. THOMPSON.